United States Patent [19]

Justus

[11] Patent Number: 4,457,543
[45] Date of Patent: Jul. 3, 1984

[54] PIPE COUPLING APPARATUS

[76] Inventor: Lowell Justus, 2634 Center Valley Rd., Willits, Calif. 95490

[21] Appl. No.: 307,654

[22] Filed: Oct. 2, 1981

[51] Int. Cl.³ .............................................. F16L 21/00
[52] U.S. Cl. ..................................... 285/236; 285/184
[58] Field of Search ............... 285/235, 236, 114, 184; 138/110

[56] References Cited

U.S. PATENT DOCUMENTS

| | | | |
|---|---|---|---|
| 2,410,753 | 11/1956 | Shinomiya | 138/110 X |
| 2,445,484 | 7/1948 | Kopperman | 285/114 X |
| 3,172,428 | 3/1965 | Tudge | 138/110 X |
| 3,813,116 | 5/1974 | Horsley | 285/236 |
| 4,172,607 | 10/1979 | Norton | 285/236 |
| 4,229,028 | 10/1981 | Gray | 285/235 |

FOREIGN PATENT DOCUMENTS

| | | | |
|---|---|---|---|
| 221379 | 8/1942 | Switzerland | 285/184 |
| 867346 | 5/1961 | United Kingdom | 285/236 |

Primary Examiner—Dave W. Arola
Attorney, Agent, or Firm—Flehr, Hohbach, Test, Albritton & Herbert

[57] ABSTRACT

A pipe coupling using a flexible hose fitted over opposing, separated ends of two pipe sections to be joined. A pair of strap clamps are mounted on opposite ends of the hose to clamp the hose onto the pipe ends. A plurality of rigid, cylindrical sleeves mounted in side-by-side relation over the hose to span substantially the entire distance between the pair of clamping means. The sleeves provide a confinement channel for the section of the flexible hose spanning the ends of the pipe sections.

6 Claims, 8 Drawing Figures

U.S. Patent    Jul. 3, 1984    4,457,543
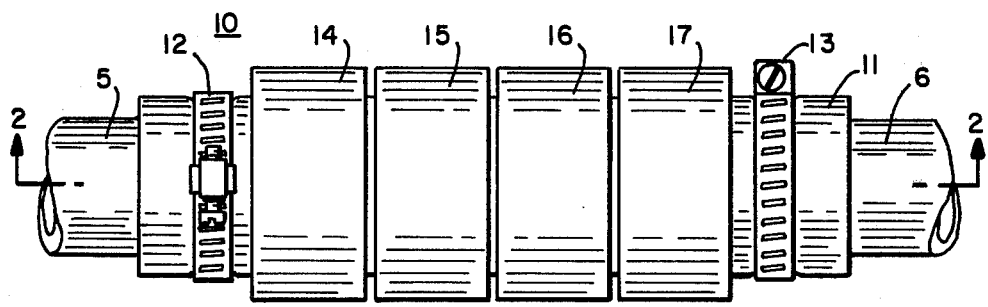
FIG.—1
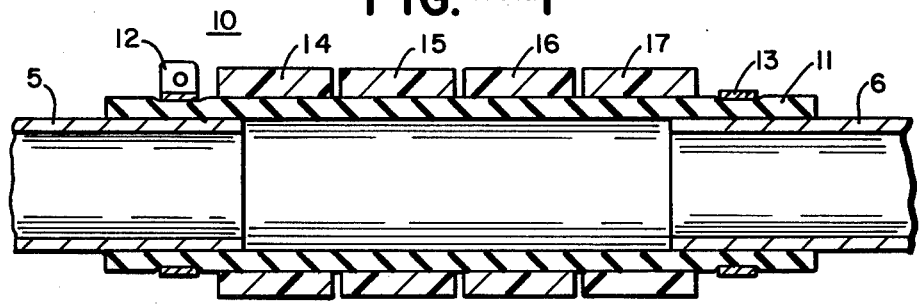
FIG.—2
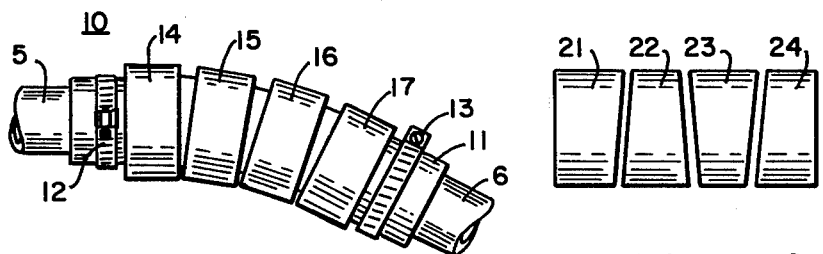
FIG.—3
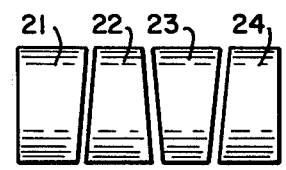
FIG.—6
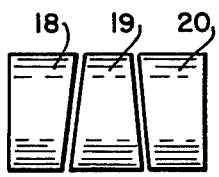
FIG.—4
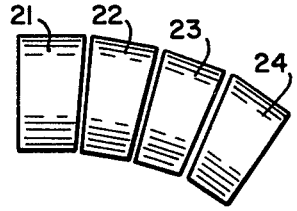
FIG.—7
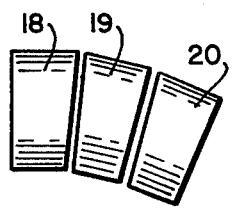
FIG.—5
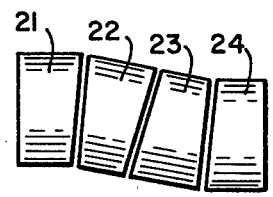
FIG.—8

PIPE COUPLING APPARATUS

This invention relates generally to pipe coupling apparatus and methods and, more specifically to pipe coupling apparatus and methods which utilize a flexible hose coupling and a hose clamp arrangement.

The coupling together of two pipe sections is often accomplished with a flexible annular gasket or hose and strap clamps tightened around each end of the hose to compress the hose tightly around the pipe ends. If the pipe is to carry a fluid under substantial pressure (e.g. 100-200 psi) and the pipe ends are separated from each other by two or three inches or more (as is often encountered in pipe repair situations), it is necessary to provide a hose confining reinforcing band over the flexible hose to prevent it from inflating and eventually rupturing.

A number of coupling arrangements using a resilient gasket or hose and a single sheet of plastic clamped over the gasket have been suggested and previously used. Coupling arrangements of this type are shown in U.S. Pat. Nos. 3,813,116 and 4,172,607. These coupling arrangements are generally effective when the pipe sections are in substantial axial alignment. However, they do not provide a satisfactory coupling arrangement when the pipe sections to be joined are out of alignment as is often encountered in pipe repair situations. Furthermore, since the single sheet is of fixed length, these prior art coupling arrangements cannot be readily applied where different pipe separation distances are encountered in pipe repair situations.

Accordingly, it is a principal object of this invention to provide an improved pipe coupling apparatus and an approved pipe coupling method.

More specifically, it is an object of this invention to provide a pipe coupling apparatus and method which provides a flexible approach to coupling pipe sections which are not necessarily in axial alignment and have differing separation distances.

One aspect of this invention features a pipe coupling comprising flexible hose means fitted over opposing separated ends of two pipe sections to be joined with a pair of clamping means mounted on opposite ends of the hose means to clamp the hose means on to the pipe ends. A plurality of rigid, cylindrical sleeves are mounted in side-by-side relation over the hose means to span substantially the entire distance between the pair of clamping means, thereby to provide a confinement channel for the sections of the flexible hose spanning the ends of the pipe sections. In one embodiment at least three rigid cylindrical sleeves are mounted over the hose means. Central ones of the cylindrical sleeves have a wedge-shaped configuration and the end sleeves have at least a matching tapered inner edge to enable the sleeves to be selectably configured to form either a straight confinement channel or a curved confinement channel, thereby enabling the coupling arrangement to join pipe sections which are axially aligned and those which are not so aligned.

In another embodiment at least four rigid cylindrical sleeves are mounted over the hose means with at least the two central sleeves having a wedge-shaped configuration and the end sleeves having at least a matching tapered inner edge. This enables the sleeves to be selectably configured to form one of a straight channel, a curved channel, or an offset channel.

Another aspect of this invention features a pipe coupling kit which comprises a length of flexible hose means adapted to be fitted over opposing separated edges of two pipe sections to be joined. The kit further includes a pair of clamping means adapted to be mounted over the hose means to clamp end sections of the hose means onto the ends of the pipe sections. The kit further includes a plurality of rigid, cylindrical sleeves adapted to be mounted in side-by-side relation over the hose means prior to placing of the hose means on both ends of the pipe sections, with a sufficient number of cylindrical sleeves provided to span substantially the entire distance between the pair of clamping means to provide a confinement channel for the sections of the flexible hose spanning the separated ends of the pipe sections. This pipe coupling kit may utilize the wedge-shaped sleeve arrangement previously described to provide a selectably configurable confinement channel for the hose.

In accordance with another aspect of this invention a pipe coupling method is provided which comprises the following steps. First a hose clamp is placed over each end of the pipe sections. Next a plurality of cylindrical sleeves having a cumulative length greater than the separation distance between the pipe sections are mounted over a flexible hose. Thereafter, the ends of the flexible hose are slipped over the ends of each pipe section and then the hose clamps are tightened over end sections of the flexible hose which overlap the pipe sections.

The pipe coupling arrangement, the pipe coupling kit, and the pipe coupling method of this invention have important advantages over prior art arrangements by providing a simple, economical and flexible approach to joining opposing separated pipe sections in a fluid-tight manner under a variety of conditions. The employment of a plurality of separate rigid cylindrical sleeves provides flexibility in tailoring the coupling arrangement to the separation distance between the pipe ends. Furthermore, the use of wedge-shaped individual sleeves to provide a selectably configured confinement channel for the flexible hose provides a simple and effective solution to joining pipe sections which are not axially aligned. Even without the tapered individual cylindrical sleeves, i.e. using sleeves with non-tapered sides, enables coupling of separated pipe sections which are not axially aligned since the curved orientation of the cylindrical sleeves still provides sufficient confinement for the flexible hose.

Other objects, features, and advantages of this invention will be apparent from a consideration of the following detailed description taken in conjunction with the accompanying drawings.

FIG. 1 is an elevational view of a pipe coupling arrangement in accordance with this invention.

FIG. 2 is a section view of a pipe coupling arrangement in accordance with this invention.

FIG. 3 is an elevational view of a pipe coupling arrangement in accordance with this invention illustrating its ability to flex for providing coupling between non-aligned pipe sections.

FIGS. 4 and 5 are elevational views of alternative arrangements of tapered cylindrical sleeves useful in connection with this invention.

FIGS. 6-7 are elevational views of various selectable arrangements of tapered sleeves useful in connection with this invention.

Referring now to FIGS. 1 and 2, a pipe coupling arrangement 10 for providing a fluid tight coupling between separated pipe sections 5 and 6 is illustrated. As shown in FIG. 2, the opposing ends of pipe sections 5 and 6 may be separated by several inches, as may be typically encountered in a pipe repair situation. However, the invention is not limited to pipe coupling arrangements with any particular separation distance between the pipe sections to be coupled. A flexible annular gasket or hose 11 is mounted over the opposing ends of the pipe sections 5 and 6, and a pair of strap-type hose clamps 12 and 13 are mounted over the ends of flexible hose 11 and tightened to clamp the flexible hose against the outer walls of the pipe sections 5 and 6. A plurality of separate rigid cylindrical sleeves 14, 15, 16, and 17 are mounted in a side-by-side relation over the hose 11 and span substantially the entire distance between the clamps 12 and 13. In particular, the sleeves 14–17 span a distance greater than the distance between pipe sections 5 and 6 to provide a confinement channel for the section of the flexible hose 11 which spans the ends of the pipe sections. This prevents any substantial ballooning of the flexible hose due to internal pressure within the coupling during in-service use of the pipe coupling.

The pipe coupling arrangements and method of this invention may be employed to couple pipe sections made of any metal, plastic, or ceramic material. The flexible hose 11 has an inner diameter which is slightly larger than the outer diameter of the pipe sections to be joined. The hose 11 may be formed from any suitable resiliently yieldable material such as rubber, synthetic rubber or other elastomeric materials. The hose clamps 12 and 13 may be any suitable type of clamp arrangement, preferably a strap-type clamp which utilizes a screw and threaded strip arrangement for drawing the clamp tightly around the outer surface of the flexible hose 11. If desired, a narrow resilient plastic sheath having a tapered overlapping end section could be provided under the hose clamps to assure the application of uniform pressure around the circumference of the hose and the underlying portion of the pipe section. If desired, a silicone sealing compound could be applied to the pipe section at the clamping location. In most installations a single hose clamp on each end of the flexible hose 11 provides sufficient gripping power and provides a fluid tight seal between the inner wall of the hose and the outer wall of the pipe section. However, additional clamps could be provided at each end of the hose if additional gripping is desired.

The individual cylindrical sleeves 14–17 may be made out of any suitable material and are advantageously formed from sections of plastic pipe sawed into the desired geometric configuration. The inner diameter of each of the cylindrical sleeves is preferably just slightly larger than the outer diameter of the flexible hose 11 to enable the sleeves to be easily slipped over the hose. The cylindrical sleeves 14–15 may be fashioned in any suitable width with three-quarters of an inch to one inch being a convenient width range for most applications. The wall thickness of the cylindrical sleeves 14–17 may similarly be of any suitable dimension, a convenient one being three-eights inch.

As illustrated in FIG. 3, the pipe coupling arrangement of this invention provides for a substantial degree of flexibility in coupling pipe sections which are not aligned coaxial with each other. Since the invention utilizes a plurality of individual cylindrical sleeves to form the confinement channel for the flexible hose 11, a certain amount of curvature or flexing in the hose 11 can be accommodated by separation between one end of each of the cylindrical sleeves 14–17 at one end. A minor amount of such spreading will still provide sufficient confinement for the flexible hose to prevent ballooning of the hose between the gaps in the cylindrical sleeves.

FIGS. 4–5 and FIGS. 6–8 illustrate preferred geometric configurations for the rigid cylindrical sleeves to provide selectably configurable confinement channels for a flexible hose on which the cylindrical sleeves are mounted. FIG. 4 shows an arrangement of three separate cylindrical sleeves in which the end sleeves 18 and 20 have tapered inner edges matching the wedge-shaped configuration of sleeve 19. When oriented as shown in FIG. 4, the sleeves 18–20 form a straight cylindrical confinement channel which may be utilized when joining pipe sections that are axially aligned. FIG. 5 illustrates that, by turning sleeve 19 through an angle of 180°, a curved confinement channel configuration is provided. This confinement channel is preferable to the somewhat discontinuous curved confinement channel shown in FIG. 3 in that the tapered edges of the sleeves 18, 19, and 20 permit the curved confinement channel to be formed without any substantial gaps between the sleeves through which any partial ballooning of the flexible hose could take place.

FIGS. 6–8 show various arrangements of four cylindrical sleeves wherein the two central sleeves 22 and 23 have tapered configurations and the two outer sleeves 21 and 24 have tapered inner edges matching the edge taper of the sleeves 22 and 23. FIG. 6 illustrates how these four cylindrical sleeves may be arranged to provide a straight cylindrical confinement channel for a flexible hose. FIG. 7 illustrates how a curved confinement channel can be formed by simply rotating one of the inner sleeves 22 and 23 (e.g. 22 in FIG. 6) by 180° and a rotating nonadjacent one of the outer sleeves 21 and 24 (e.g. 24 in FIG. 6) through 180°. FIG. 8 illustrates how the same four sleeves can be oriented to provide a confinement channel with a longitudinal offset. This is accomplished by simultaneously rotating both of the central sleeves 22 and 23 by 180° with respect to the end sleeves 21 and 24. It will be appreciated that other configurations of these four sleeves could also be provided if desired. The ones illustrated are probably the ones most useful. It should also be appreciated that the degree of taper of the edges of the sleeves will determine the respective curvature angle and offset distance of the configurations shown in FIGS. 7 and 8.

Although arrangements of three separate sleeves are shown in FIGS. 4 and 5 and arrangements of four separate sleeves are shown in FIGS. 6–8, it should be understood that the invention may employ as few as two sleeves or substantially more than four sleeves. It will be appreciated that if tapered sleeve edges are utilized and a larger number of cylindrical sleeves are provided, a wider variety of confinement channel shapes can be configured by selectably orienting the tapered sleeves with respect to each other.

The pipe coupling arrangement of this invention is advantageously supplied as a kit of parts to be assembled by the purchaser to perform a particular pipe coupling arrangement. Each individual kit would generally contain a length of flexible hose, at least a pair of strap clamps such as clamps 12 and 13 shown in FIG. 1 and preferably four to six rigid cylindrical sleeves having the configuration shown in FIGS. 6-8. A separate kit could be provided for each size of pipe to be joined so that appropriate sizes for the hose 11 and the cylindrical sleeves 21-24 will be included in the kit. By providing in each kit a flexible hose of a length about six to eight inches together with four to six cylindrical sleeves of one inch length, the kit can be adapted to couple pipes having a variety of separation distances. The user of the kit can cut the flexible hose to an appropriate length for his installation requirement and can utilize the number of cylindrical sleeves required to span the distance between the pipe ends to be joined. It should be apparent that such a kit would be especially advantageous for repairing leaks in plastic or iron water pipes or for reconfiguring pipe installations.

The pipe coupling method of this invention is facilitated utilizing such a kit. Generally, the method involves slipping the clamps 12 and 13 over the pipe sections 5 and 6 and then slipping an appropriate number of the cylindrical sleeves 14-17 or 21-24 for example over the flexible hose 11 which has been preferably cut to an appropriate length to span the distance between the separated pipe sections. Thereafter, each of the ends of the flexible hose 11 may be slipped over the ends of the pipe sections 5 and 6, using an appropriate lubricating fluid if needed to assist in pushing the ends of hose 11 over the ends of the pipe sections. Then, the clamps 11 and 12 can be positioned over the hose 11 and tightened down to complete the pipe coupling installation.

While the pipe coupling arrangement and method of this invention have been described above in various embodiments and variations, it should be apparent that other embodiments and variations could be fashioned by persons skilled in the art without departing from the scope of the claims.

What is claimed is:

1. A pipe coupling comprising flexible hose means fitted over opposing, ends of two pipe sections to be joined but separated from each other by at least several inches, a pair of clamping means mounted on opposite ends of said hose means to clamp said hose means onto said pipe ends, and a plurality of rigid, cylindrical sleeves mounted in side-by-side relation over said hose means to span substantially the entire distance between said pair of clamping means and thereby to provide a confinement channel for the section of said flexible hose spanning said ends of said pipe sections, the total cumulative length of said sleeves being only slightly less than the distance between said pair of clamping means and the inner diameter of each of said sleeves being only slightly greater than the outer diameter of said flexible hose, each of said clamping means including at least one structural portion projecting radially outward a distance sufficient to mechanically confine said sleeves therebetween.

2. The pipe coupling of claim 1, wherein at least three rigid cylindrical sleeves (18, 19, 20) are mounted over said hose means, at least a central one (19) of said sleeves has a wedge-shaped configuration with two tapered edges formed by a gradually reduced wall length from one side of said sleeve to the other and the end sleeves (18, 20) each have at least a tapered inner edge matching the tapered edges of said central sleeve and formed by a gradually reduced wall length from one side of said sleeve to the other, said sleeves being selectably configured to form a straight confinement channel (FIG. 4) by positioning the longer wall portions of said end sleeves adjacent the shorter wall portions of said central sleeve or a curved confinement channel (FIG. 5) by positioning all of the longer wall portions of said central and end sleeves adjacent each other, said curved confinement channel enabling said coupling to join pipe sections which are not axially aligned.

3. The pipe coupling of claim 1, wherein at least four rigid cylindrical sleeves (21, 22, 23, 24) are mounted over said hose means, at least two central sleeves (22, 23) have a wedge-shaped configuration with two tapered edges formed by a gradually reduced wall length from one side of said sleeve to the other and the end sleeves (21, 24) have at least a tapered inner edge matching the tapered edges of said central sleeve and formed by a gradually reduced wall length from one side of said sleeve to the other to enable said sleeves to be selectably configured to form one of a straight confinement channel, a curved confinement channel, or an offset confinement channel, said straight confinement channel (FIG. 6) being formed by respectively alternating the adjacent positioning of longer and shorter wall portions of said end and central sleeves from one end of the coupling to the other, said curved confinement channel (FIG. 7) being formed by placing all of the shorter wall portions of all of said central and end sleeves adjacent each other, and said offset confinement channel (FIG. 8) being formed by positioning the two central sleeves with longer end wall portions on one adjacent to shorter end wall portions on the other and by positioning the short wall portions of said end sleeves adjacent short wall portions of the immediately adjacent central sleeve.

4. A pipe coupling kit comprising a length of flexible hose adapted to be fitted over opposing separated ends of two pipe sections to be joined but separated by at least several inches, a pair of clamping means adapted to be mounted over said hose means to clamp end sections of said hose means onto said ends of said pipe sections, and a plurality of rigid cylindrical sleeves adapted to be mounted in side-by-side relation over said hose means to span substantially the entire distance between said pair of clamping means and thereby to provide a confinement channel for the section of said flexible hose spanning said ends of said pipe sections, the total cumulative length of said sleeve being only slightly less than the distance between said pair of clamping means and the inner diameter of each of said sleeves being only slightly greater than the outer diameter of said flexible hose, each of said clamping means including at least one structural portion projecting radially outward a distance sufficient to mechanically confine said sleeves therebetween.

5. The pipe coupling kit of claim 4, wherein at least three rigid cylindrical sleeves (18, 19, 20) are mounted over said hose means, at least a central one (19) of said sleeves has a wedge-shaped configuration with two tapered edges formed by a gradually reduced wall length from one side of said sleeve to the other and the end sleeves (18, 20) each have at least a tapered inner edge matching the tapered edges of said central sleeve and formed by a gradually reduced wall length from one side of said sleeve to the other, said sleeves being selectably configured to form a straight confinement channel (FIG. 4) by positioning the longer wall portions of said end sleeves adjacent the shorter wall portions of said central sleeve or a curved confinement channel (FIG. 5) by positioning all of the longer wall portions of said central and end sleeves adjacent each other, said curved confinement channel enabling said coupling to join pipe sections which are not axially aligned.

6. A pipe coupling kit as claimed in claim 4, wherein at least four rigid cylindrical sleeves (21, 22, 23, 24) are mounted over said hose means, at least two central sleeves (22, 23) have a wedge-shaped configuration with two tapered edges formed by a gradually reduced wall length from one side of said sleeve to the other and the end sleeves (21, 24) have at least a tapered inner edge matching the tapered edges of said central sleeve and formed by a gradually reduced wall length from one side of said sleeve to the other to enable said sleeves to be selectably configured to form one of a straight confinement channel, a curved confinement channel, or an offset confinement channel, said straight confinement channel (FIG. 6) being formed by respectively alternating the adjacent positioning of longer and shorter wall portions of said end and central sleeves from one end of the coupling to the other, said curved confinement channel (FIG. 7) being formed by placing all of the shorter wall portions of all of said central and end sleeves adjacent each other, and said offset confinement channel (FIG. 8) being formed by positioning the two central sleeves with longer end wall portions on one adjacent to shorter end wall portions on the other and by positioning the short wall portions of said end sleeves adjacent short wall portions of the immediately adjacent central sleeve.

* * * * *